(12) United States Patent
Tran et al.

(10) Patent No.: US 12,494,993 B2
(45) Date of Patent: Dec. 9, 2025

(54) MULTICLOUD HOSTING FOR CONTAINERIZED APPLICATIONS

(71) Applicant: Royal Bank of Canada, Toronto (CA)

(72) Inventors: Vinh Tran, Toronto (CA); Edmund Lau, Markham (CA); Mehrdad Abdolghafari, Toronto (CA); Michael Jastrzebski, Toronto (CA); Ranji Narine, Mississauga (CA)

(73) Assignee: Royal Bank of Canada, Toronto (CA)

( * ) Notice: Subject to any disclaimer, the term of this patent is extended or adjusted under 35 U.S.C. 154(b) by 301 days.

(21) Appl. No.: 17/902,140

(22) Filed: Sep. 2, 2022

(65) Prior Publication Data

US 2024/0080264 A1 Mar. 7, 2024

(51) Int. Cl.
*H04L 45/302* (2022.01)
*H04L 45/745* (2022.01)
*H04L 45/76* (2022.01)

(52) U.S. Cl.
CPC .......... *H04L 45/306* (2013.01); *H04L 45/745* (2013.01); *H04L 45/76* (2022.05)

(58) Field of Classification Search
CPC ...... H04L 45/306; H04L 45/745; H04L 45/76
See application file for complete search history.

(56) References Cited

U.S. PATENT DOCUMENTS

| | | | | |
|---|---|---|---|---|
| 12,218,831 | B2* | 2/2025 | Nallamothu | H04L 45/745 |
| 2020/0059420 | A1* | 2/2020 | Abraham | H04L 41/0843 |
| 2022/0029917 | A1* | 1/2022 | Masnauskas | H04L 12/4633 |
| 2023/0079209 | A1* | 3/2023 | Nallamothu | H04L 12/4625 |
| | | | | 709/238 |
| 2023/0126168 | A1* | 4/2023 | Birsan | G06F 9/45558 |
| | | | | 718/1 |
| 2024/0069884 | A1* | 2/2024 | Majumdar | G06F 8/65 |
| 2024/0080264 | A1* | 3/2024 | Tran | H04L 45/76 |
| 2024/0126581 | A1* | 4/2024 | Nguyen | G06F 9/45558 |
| 2024/0160453 | A1* | 5/2024 | Ueda | G06F 9/44526 |

* cited by examiner

*Primary Examiner* — David R Lazaro

(57) ABSTRACT

A method for deploying a containerized application from a central application management hub to a plurality of cloud environments, the method comprising the steps of: receiving a containerized application suitable for deployment; receiving an environment file designating a first environment and a second environment of the plurality of cloud environments; consulting a routing table to determine a first network path associated with the first environment and a second network path associated with the second environment; generating packets of the containerized application; and sending the packets on the first network path and the second network path; wherein the containerized application is received by a respective operators of the first environment and the second environment for subsequent deployment.

20 Claims, 6 Drawing Sheets

MULTICLOUD HOSTING FOR CONTAINERIZED APPLICATIONS

TECHNICAL FIELD

The present disclosure is directed at deployment of containerized application in cloud based environments.

BACKGROUND

Increasingly, network applications and services are deployed on "cloud" infrastructures. In many cloud infrastructures, a third-party "cloud provider" owns a large pool of physical hardware resources (e.g., networked servers, storage facilities, computational clusters, etc.) and leases those hardware resources to users for deploying network applications and/or services.

Rather than leasing the hardware resources directly, the cloud provider often allows clients to specify and lease "virtual machines" that match the client's specifications. The virtual machines are then deployed on the cloud-provider's hardware resources. The underlying hardware resources implementing the cloud are therefore invisible to the client, who sees only the virtual machines.

Cloud infrastructures enable many benefits both for the software administrators and for the hardware owners (i.e., cloud providers). Software administrators can specify and lease computing resources (i.e., virtual machines) matching their exact specifications without up-front hardware purchase costs. The administrators can also modify their leased resources as application requirements and/or demand changes. Hardware owners (i.e., cloud providers) also realize substantial benefits from cloud infrastructures. The provider can maximize hardware utilization rates by hosting multiple virtual machines on a single physical machine without fear that the applications executing on the different machines may interfere with one another. Furthermore, the ability to easily migrate virtual machines between physical machines decreases the cloud provider's hardware maintenance costs. For these reasons, even large companies that own substantial hardware resources (e.g., search engine companies, social networking companies, e-commerce companies, etc.) often deploy those hardware resources as private clouds.

Today, many network applications and services are hosted on cloud infrastructures. For examples, Internet startups often deploy their web applications on cloud infrastructures rather than purchase hardware, IT departments use cloud infrastructures to deploy various IT services (such as email, social networking, backup storage, etc.), and web giants deploy their own hardware resources as private clouds.

As the demand for cloud computing has grown, so has the number of cloud computing providers. Different cloud providers often offer different qualities of service, different pricing, and/or other distinctive features that make those particular providers more desirable for one purpose or another. Accordingly, some organizations lease resources from multiple cloud providers. Unfortunately, the interfaces to different providers often differ and managing multiple deployments on multiple clouds has become a problem for many organizations.

Further, it is recognized that traditional deployment of applications in different cloud environments can be technically challenging due to different cloud environments use different deployment languages and techniques.

SUMMARY

It is an object of the present invention to provide a system and method for deployment of a containerized application in multiple different cloud environments that obviates or mitigates at least one of the above presented disadvantages.

A first aspect provided is a method for deploying a containerized application from a central application management hub to a plurality of cloud environments, the method comprising the steps of: receiving a containerized application suitable for deployment; receiving an environment file designating a first environment and a second environment of the plurality of cloud environments; consulting a routing table to determine a first network path associated with the first environment and a second network path associated with the second environment; generating packets of the containerized application; and sending the packets on the first network path and the second network path; wherein the containerized application is received by a respective operators of the first environment and the second environment for subsequent deployment.

A second aspect provide is a system for deploying a containerized application from a central application management hub to a plurality of cloud environments, the system comprising: a processor and memory for implementing the steps of: receiving a containerized application suitable for deployment; receiving an environment file designating a first environment and a second environment of the plurality of cloud environments; consulting a routing table to determine a first network path associated with the first environment and a second network path associated with the second environment; generating packets of the containerized application; and sending the packets on the first network path and the second network path; wherein the containerized application is received by a respective operators of the first environment and the second environment for subsequent deployment.

BRIEF DESCRIPTION OF THE DRAWINGS

In the accompanying drawings, which illustrate one or more example embodiments.

THE DETAILED DESCRIPTION

Figure 1:
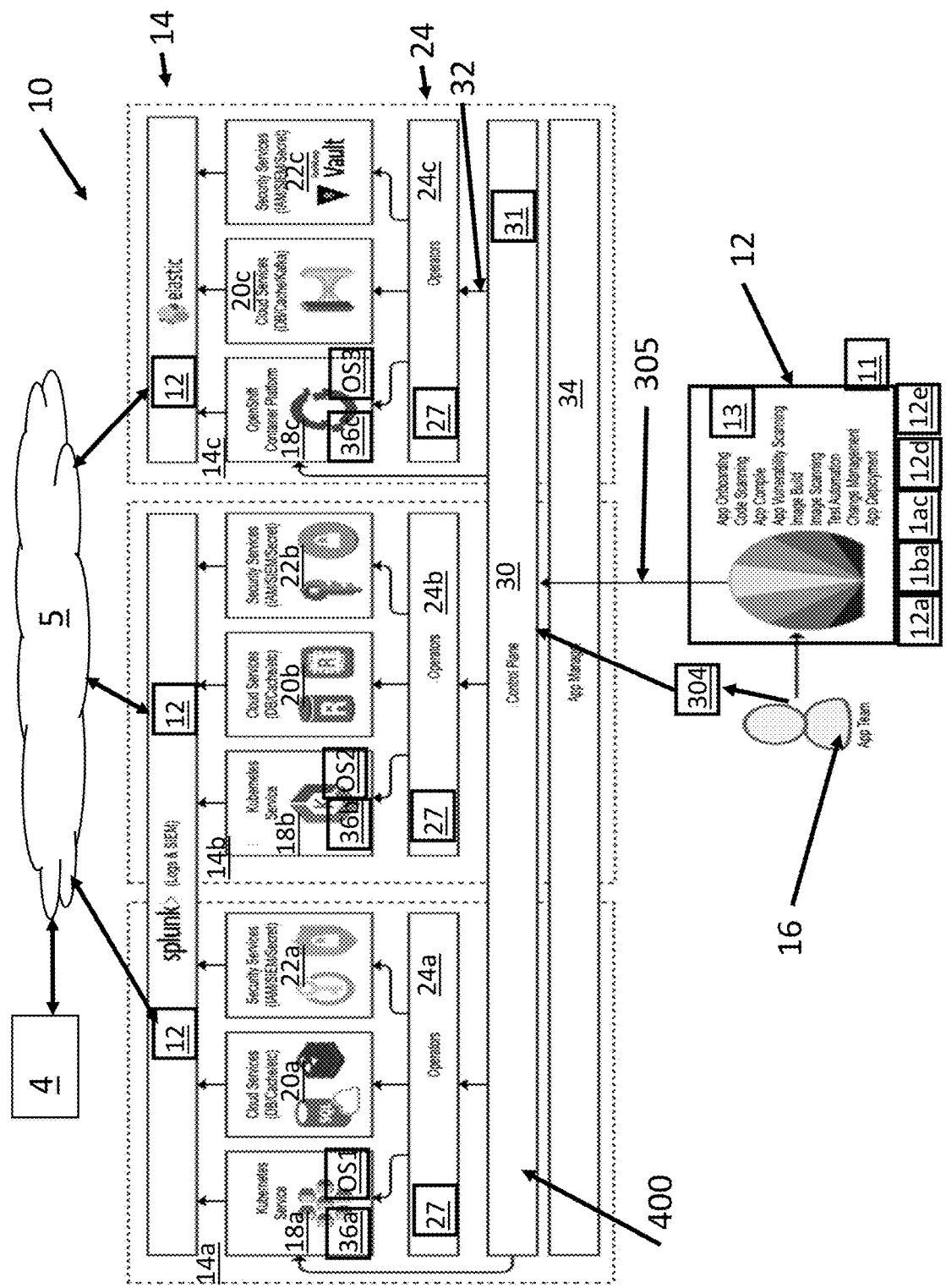
FIG. 1 depicts an example system for deploying containerized applications.

Referring to FIG. 1, shown is a multicloud application hosting system 10 for deploying containerized applications 12 in the public cloud environment 14. One advantage of the system 10 is that it provides an environment where application development teams 16 can deploy their applications 12 to multiple cloud environments 14a, 14b, 14c concurrently (e.g. a plurality of different cloud computing services, e.g. Azure™, Amazon Web Services (AWS), etc.). As such, it is recognised that a plurality of applications 12 can be sent to the control plane 30 for subsequent deployment 30. Once deployed, the applications 12 can be accessed via a communications network 5 by network devices 4 (e.g. application users).

Each of the cloud environments 14a,b,c can have a respective container orchestration platform 18a,b,c (also referred to generically as container orchestration platform 18), which has the task of automating the installation, scaling, and management of containerized workloads and services for the container application 12. Container orchestration platform 18a,b,c can provide application management tasks such as scaling containerized applications 12, rolling out new versions of the applications 12ps, and providing monitoring, logging and debugging of the applications 12, among other functions/services.

Each of the cloud environments 14a,b,c can have a respective cloud services platform 20a,b,c (also referred to generically as cloud services platform 20), which provides for deployment of the application using a respective a cloud infrastructure by detaching computing capabilities from hardware components, such as separating: processing power from central processing units (CPUs); active memory from random access memory (RAM) chips; graphics processing from the graphics processing units (GPUs); and data storage availability from datacenters or hard drives. This abstraction can be accomplished through virtualization. Once separated, the storage, compute, and networking components of the application 12 can be provided through the Internet as Infrastructure-as-a-Service (IaaS), i.e. provides users with physical computer, networking, and storage resources.

Each of the cloud environments 14a,b,c can have a respective cloud computing security service 22a,b,c (also referred to generically as cloud computing security service 22), which consists of a set of policies, controls, procedures and technologies that work together to protect cloud-based systems, data, and infrastructure. The security measures provided to deployment of the application 12 protect cloud data, support regulatory compliance, protect customers' privacy and set authentication rules for individual users and devices accessing or otherwise running the application 12 in the respective cloud environment 14a,b,c. The cloud computing security service 22a,b,c can also provide authenticated access and filtering traffic.

Each of the cloud environments 14a,b,c can have a respective Operator service 24a,b,c (also referred to generically as Operator service 24), which can be defined as software extensions that make use of custom resources to manage the applications 12 and their components. For example, the operator service 24a,b,c can be interact with the container orchestration platform 18a,b,c that act as controllers for a Custom Resource (e.g. SampleDB) for the application 12. The operator service 24a,b,c can be used to automate: deploying the application 12 on demand; taking and restoring backups of that application's 12 state; handling upgrades of the application 12 code alongside related changes such as database schemas or extra configuration settings; publishing a Service to applications 12; and simulating failure. As such, these Operator services 24a,b,c are responsible for automating integrations within each respective cloud platform environment 14a,b,c.

The operator service 24a,b,c can be deployed by adding a Custom Resource Definition and its associated Controller 27 to the respective cloud environment 14a, 14b, 14c. The Controller 27 of the operator service 24a,b,c can run outside of a control plane 30, similar to the running of the containerized application 12, for example, the controller 27 can be run in the cloud environment 14a, 14b, 14c as a Deployment.

As further described below, the control plane 30 is the part of the system 10 that controls how applications 12 are deployed to (e.g. Kubernetes clusters) hosted in various cloud locations 14a,b,c. The control plane 30 implements (e.g. Kubernetes) operators (e.g. operator services 24a,b,c) that facilitate and govern containerized application 12 deployments. This control plane 30 can standardize how the system 10 can organize multi-tenancy, facilitate centralized logging and security incident and event management, access secrets, and manage identity and authentication of the applications 12. The control plane 30 can enforce these standards via infrastructure as code, which can support resiliency and recovery in case of disaster. The use of the code can also facilitate that critical applications 12 are deployed in a manner that is consistent with organizational requirements.

An example embodiment of deploying the applications 12 on the various cloud locations 14a,b,c is by forwarding data packets 13 of the application 12, meaning how data resident in the containerized application 12 are sent to the operators 24a,b,c. The process of creating/utilizing a routing table 31 (e.g. in conjunction with a manifest 9 see FIG. 2) for the data packets 13 of the application 12 can be considered part of the control plane 30. It is recognised that routers (not shown) use various protocols to identify network paths 32 to the various cloud environments 14a,b,c, and they store these paths 32 in the routing table 31. It is advantageously recognised that the control plane 30 is common to and thus shared by each of the applications 12 and the various environments 14a,b,c.

Figure 3:
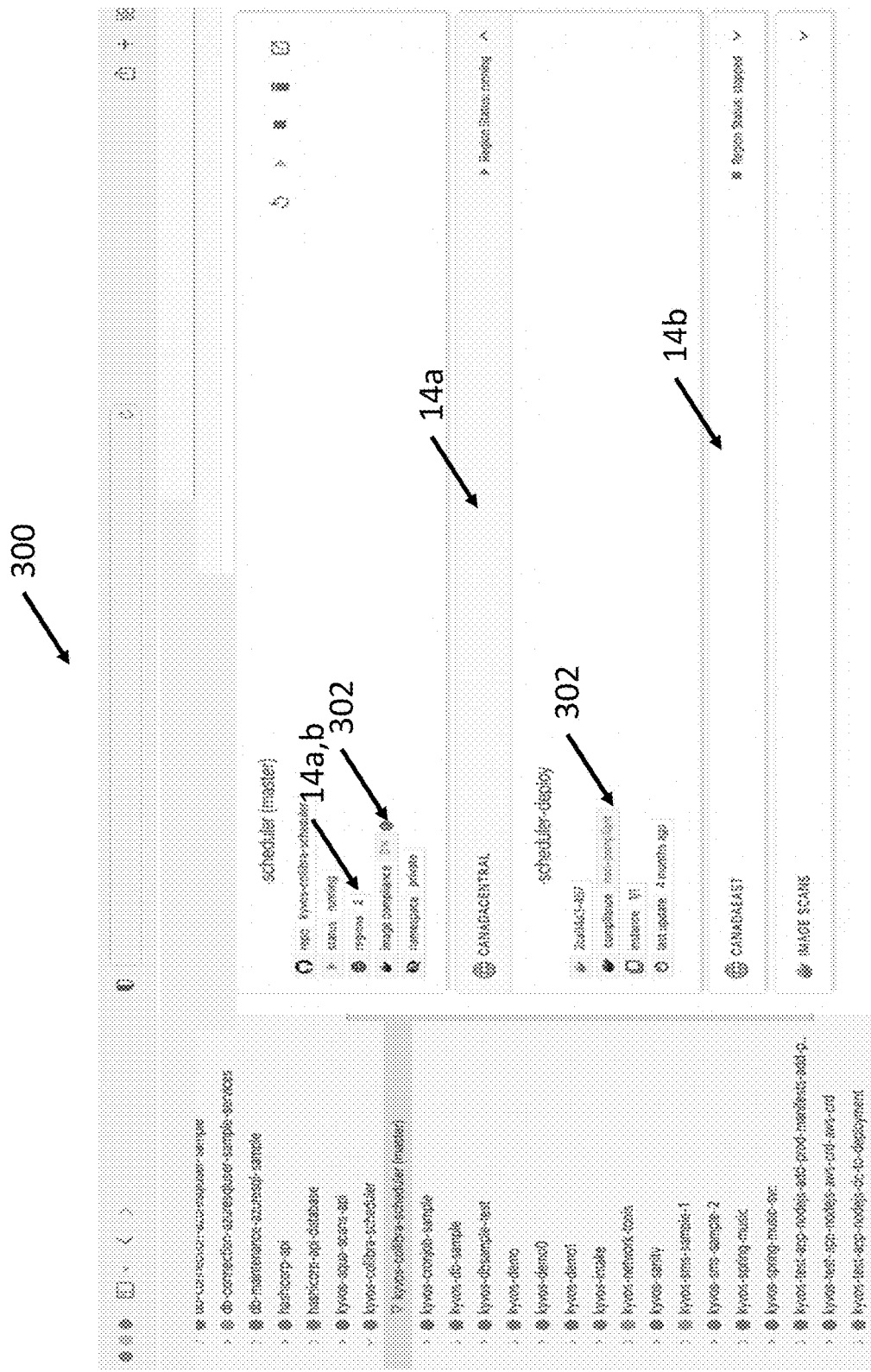
FIG. 3 represents an example management interface of the system of FIG. 1.
Figure 4:
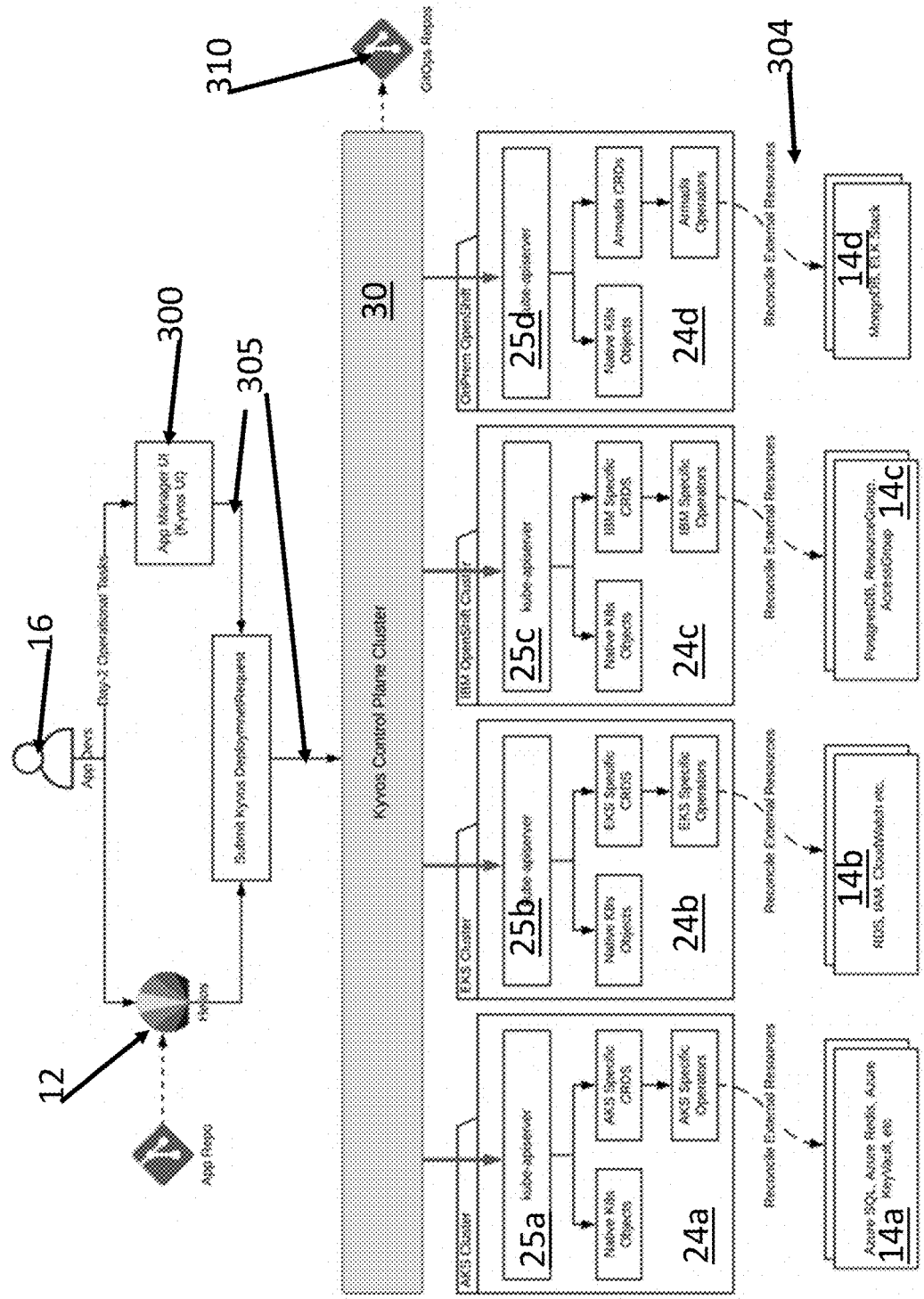
FIG. 4 represents an example operation of the control plane of the system of FIG. 1.

Referring to FIG. 4, the App Manager UI 300 communicates with the Control Plane 30 via API requests (e.g. deployment requests such as API calls 305 including the application 12 as well as the environment file 38—designating two or more of the environments 14a,b,c,d for desired deployment). Within the Control Plane 30 is a Git repository 310 (e.g. file storage) consisting of a collection of Kubernetes manifests (e.g. files) of the various different definitions (e.g. versions) of the applications 12. These files are pushed by the control plane 30 from the repository 310 into the local respective environment server 25a,b,c,d (e.g. of the operator services 24a,b,c,d assigned to each of the respective Kubernetes environments 14a,b,c,d) to facilitate initial deployment as well as further updates and modifications in the content of the file (e.g. the containerized application 12). The repository 310 can be monitored by the respective operator service 24a,b,c,d, which can apply (e.g. Kubernetes) resources 304 (using the respective controller 70) from the repository 310 to a designated (e.g. via environment file 38) Kubernetes cluster 14a,b,c,d via the respective designated Kube-API server 25a,b,c,d. As such, the controllers 27 (e.g. Kubernetes controller) associated with their respective operator service 24a,b,c,d can be responsible for continuously monitoring all running applications 12 and comparing their live state to the desired state specified in the Git repository 310. As such, the controllers 27 can compare the running states of the applications 12 on the various environments 14a,b,c,d with the defined state of the applications 12 in the repository 310 and therefore identify deployed applications 12 with a live state that deviates from the desired state as OutOfSync. In this manner, the information 302 displayed on the interface 300 is kept up to date, see FIG. 3.

Using the system 10, the developers 16 can deploy the container applications 12 as well as cloud resources 304 (such as databases) using the control plane 30, which is considered a central system that manages the deployments of the plurality of different applications 12 to multiple different environments 14a,b,c (e.g. multiple kubernetes clusters across the clouds). As discussed herein, the kubernetes clusters can be considered as the environments 14a,b,c where each application 12 gets deployed, such that the kubernetes clusters are running in the respective different environments 14a,b,c.

Referring to FIG. 3, also provided in the system 10 can be an application manager 34, which provides application developers 16 with visibility into their applications 12 running in the various Kubernetes clusters 14a,b,c. Application developers 16 can view logs, start/stop applications 12, access deployment configurations, view container scanning results and overall manage their applications 12 using the App Manager 34. Further, the application manager 34 can be used to monitor software application's 12 performance via an interface 300 in the cloud environment 14a, 14b, 14c and alert administrators if there is a problem. For example, the management interface 300 for application teams 16 that have deployed their applications 12 to the application manager 34 can provide logging, visibility, container scanning results, number of instances running or otherwise stopped, and configuration information 302 across their different deployments to multiple Kubernetes clusters 14a,b.

As an example, the application manager 34 can be responsible for receiving the containerized application 12 from the developers 16, transmitting the application 12 to the control plane 30, as well as overseeing the installation, patching and updating of the application 12 on behalf of the developers 16.

Further, it is recognized that the App Manager 34 can communicate with the Control Plane 30 via API calls 305. These API calls 305 provide insight into the Kubernetes resources 304 (see FIGS. 2,4) that are deployed across each of the clusters 14a,b,c and then the App Manager 34 can aggregate and organize the resources 304 in a logical manner for each deployment, as accessible via the interface 300. The App Manager 34 can make the Kubernetes API calls across all of the clusters 14a,b,c utilizing the control plane 30 as a common management hub/communicator to all of the environments 14a,b,c (e.g. to the respective operators 24a,b,c) and can therefore visualize the results for the app teams 16 on the interface 300 to easily see and update, as desired.

Figure 2:
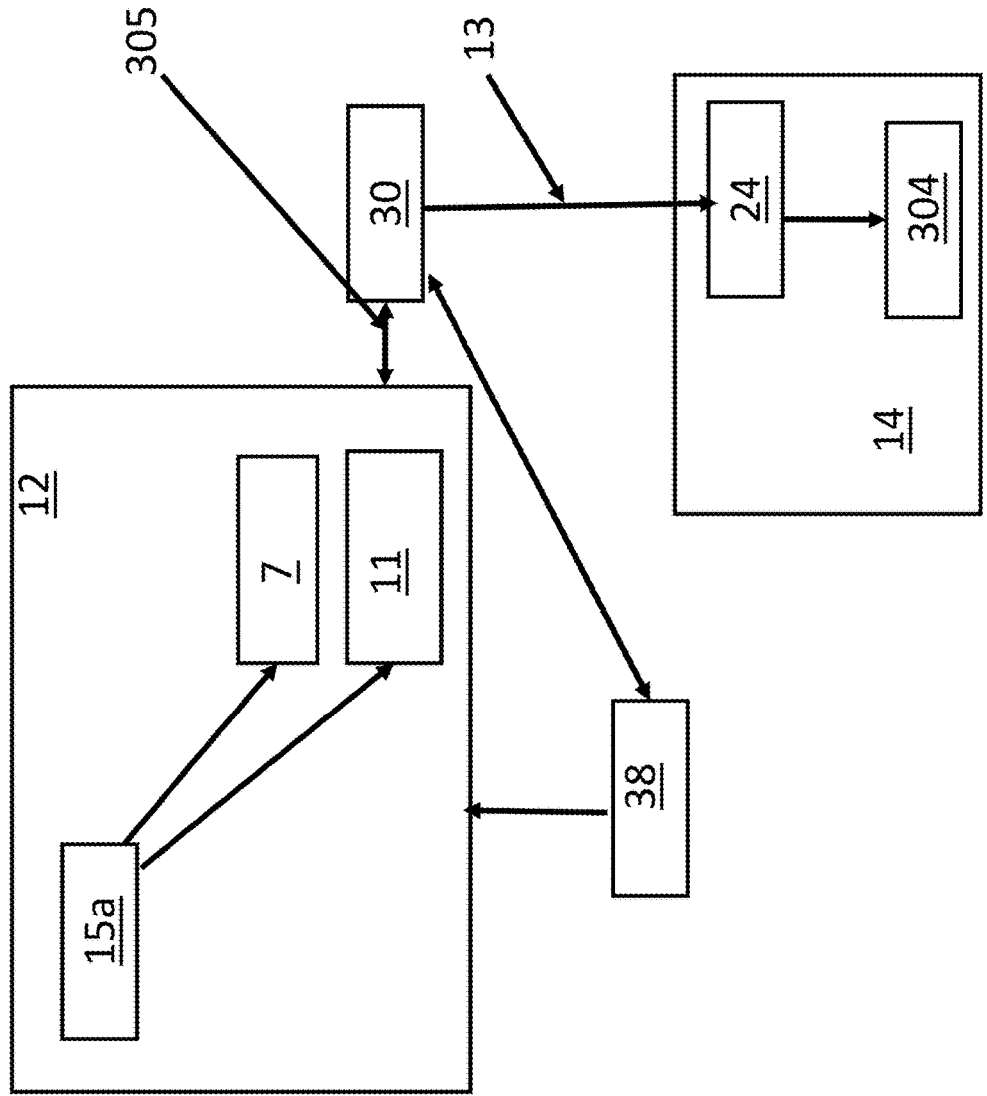
FIG. 2 represents an example containerized application and ecosystem for the system of FIG. 1.

As discussed above, container applications 12 provide a standard way to package the application's code 12a, system tools 12b, configurations 12c, runtime 12d, and dependencies 12e (e.g. libraries) into a single object (i.e. container) as part of multiple file system layers 11 (see FIG. 2). A container image as the application 12 is compiled from file system layers 11 built onto a parent or base image. An application 12 can be embodied as the container image which is an unchangeable, static file (e.g. image) that includes executable code 12d so the application 12 can run an isolated process on information technology (IT) infrastructure provided in the respective environment 14a,b,c. Containers in general can share an operating system OS (as executed by an engine 36a,b,c) installed on the server and run as resource-isolated processes, providing reliable, and consistent deployments, regardless of the environment 14a, b,c. As such, containers encapsulate the application 12 as the single executable package of software 12 that bundles application code together with all of the related configuration files, libraries, and dependencies required for it to run. Containerized applications 12 can be considered "isolated" in that the container application 12 does not bundle in a copy of the operating system OS (e.g. underlying OS kernel) used to run the application 12 on a suitable hardware platform in the environment 14a,b,c. Instead, an open source runtime engine 36 (e.g. Kubernetes runtime engine) is installed on the environment's 14a,b,c host operating system and becomes the conduit for container applications 12 to share the operating system OS (e.g. host OS1, OS2, OS3) with other container applications 12 on the same computing system of the environment 14a,b,c.

As such, it is recognized that each respective cloud environment 14a,b,c has its own different respective operating system OS1, OS2, OS3. In other words, an application 12 configured for deployment (e.g. via processing of the application 12 by the respective operator 24a) for one environment 14a using the operating system OS1 would not be deployable on a different could environment 14b,c using their different operating systems OS2, OS3. In order to be deployable on a respective cloud environment 14a,b,c, the application 12 must be processed separately by the respective operator 24a,b,c (and their respective container orchestration platform 18a,b,c). In other words, the engine 36a would only be able to deploy an application 12 as processed by the components 18a, 24a of the environment 14a. In other words, the engine 36b would only be able to deploy an application 12 as processed by the components 18b, 24b of the environment 14b. In other words, the engine 36c would only be able to deploy an application 12 as processed by the components 18c, 24c of the environment 14c.

As such, it is recognised that the engine 36a,b,c takes user input, interacts with the container orchestrator 18a,b,c, loads the container image file 12 (from a repository, usually stored in a cloud service, either public or private) and prepares storage to run the container application 12. Finally, the engine 36 calls and hands off the container application 12 to the container runtime 18a,b,c to start and manage the container application's deployment. The container runtime 18a,b,c can be represented as is a low-level component of the container engine 36 that mounts the container application 12 and works with the OS kernel to start and support the containerization process.

Given the system 12 as described above, it is clear that the application 12 development and the infrastructure provisioning (in the environment 14a,b,c) are advantageously decoupled from one another, thereby providing for a single container application 12 to be selectively deployed to multiple different environments 14a,b,c concurrently, using the control plane 30. As such, it is recognized that the container application 12 facilitates abstracting the hardware differences between the various environments 14a,b,c in order to deploy the applications 12 in a consistent form factor and manner.

Referring to FIG. 2, the container application 12 includes the file system layers 11 including the container configuration 7 (how to run, port, volume details). The file system layers 11 contain all the software components, operating system libraries, of the software—basically all the components 12a,b,c,d,e used to run the software inside the container 12. The manifest 15a includes information about the image, it's size, the layers and digest. Also associated with the application 12 is a environment file 38, in which one or more environments 14a,b,c can be specified for deployment of the application 12. As such, the environment file 38 can be used in conjunction with the application 12 to instruct the control plane 30 for which environments(s) 14a,b,c the application 12 should be deployed. As such, the environment file 38 is used by the control plane 30 to select which of the network paths 32 in the routing table 31 should be used to send the packets 13 of the application 12. In this manner, the application 12 is distributed to one or more of the environments 14a,b,c, for deployment, e.g. as facilitated by the respective operators 24.

Given the above, it is clear that the system 10 provides for any different advantages, such as but not limited to: 1) centrally managing clusters and application workloads in a highly available and secure manner; 2) abstracting different Kubernetes versions and capabilities of the application 12 that are available across different cloud environments 14a, b,c (e.g. Azure, AWS and Openshift); 3) simplifying a complex eco-system in Kubernetes for different user groups to use; 4) introducing infrastructure as code concepts in order to facilitate deployment of applications 12 in a declarative manner; 5) centrally managing base images of the applications 12 in the control plane 30 for the developers 16 to utilize; and 6) providing security controls and governance as part of the development of the applications 12, while liberating application 12 teams to creatively use technology. As such, the system 10 provides a way for developers 16 to develop applications 12 while decoupling the application 12 development from infrastructure provisioning.

Figure 5:
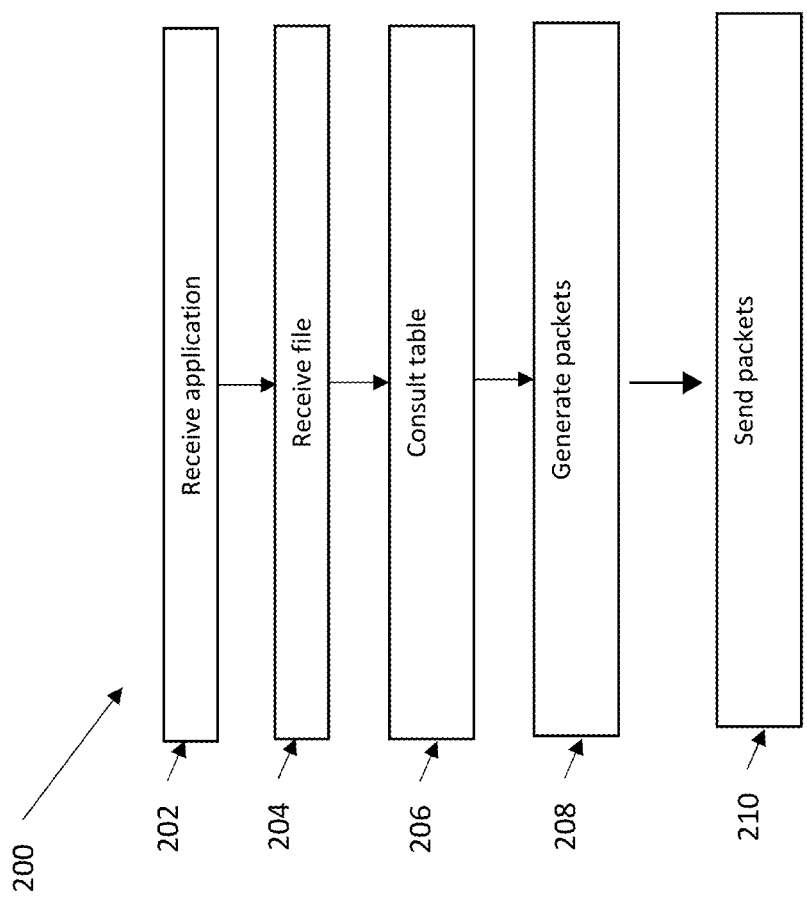
FIG. 5 depicts an example operation of the network of FIG. 1.

Referring to FIG. 5, shown is an example operation 200 of the system 10 of FIG. 1, for deploying a containerized application 12 from a central application management hub (e.g. control plane 30) to a plurality of cloud environments 14a,b,c, the method comprising the steps of: receiving 202 a containerized application 12 suitable for deployment; receiving 204 an environment file 38 designating a first environment 14a and a second environment 14b of the plurality of cloud environments 14a,b,c; consulting 206 a routing table 31 to determine a first network path 32 associated with the first environment 14a and a second network path 32 associated with the second environment 14b; generating 208 packets 13 of the containerized application 12; and sending 210 the packets 13 on the first network path 32 and the second network path 32; wherein the containerized application 12 is received by a respective operators 24a,b of the first environment 14a and the second environment 14b for subsequent deployment.

Example Computing System

Figure 6:
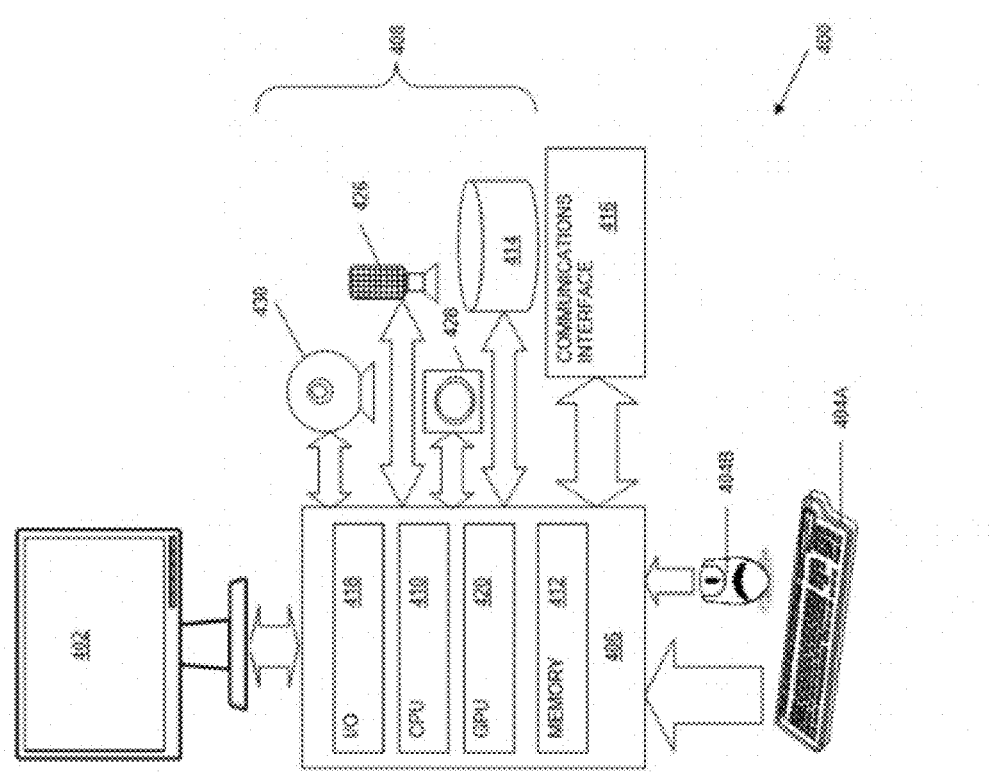
FIG. 6 depicts an example computer system that may be used to implement the neural network of FIG. 1.

An example computer system in respect of which the technology herein described may be implemented is presented as a block diagram in FIG. 6, for example in implementing the control plane 30. The example computer system is denoted generally by reference numeral 400 and includes a display 402, input devices in the form of keyboard 404A and pointing device 404B, computer 406 and external devices 408. While pointing device 404B is depicted as a mouse, it will be appreciated that other types of pointing device, or a touch screen, may also be used.

The computer 406 may contain one or more processors or microprocessors, such as a central processing unit (CPU) 410. The CPU 410 performs arithmetic calculations and control functions to execute software stored in a non-transitory internal memory 412, preferably random access memory (RAM) and/or read only memory (ROM), and possibly additional memory 414. The additional memory 414 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 414 may be physically internal to the computer 406, or external as shown in FIG. 6, or both.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal and/or additional memory 414 for execution by the one or more processors or microprocessors to effect formatting and subsequent distribution of packets 13 of containerized applications 12 to multiple different cloud environments 14a,b,c.

The computer system 400 may also include other similar means for allowing computer programs or other instructions to be loaded. Such means can include, for example, a communications interface 416 which allows software and data to be transferred between the computer system 400 and external systems and networks. Examples of communications interface 416 can include a modem, a network interface such as an Ethernet card, a wireless communication interface, or a serial or parallel communications port. Software and data transferred via communications interface 416 are in the form of signals which can be electronic, acoustic, electromagnetic, optical or other signals capable of being received by communications interface 416. Multiple interfaces, of course, can be provided on a single computer system 400.

Input and output to and from the computer 406 is administered by the input/output (I/O) interface 418. This I/O interface 418 administers control of the display 402, keyboard 404A, external devices 408 and other such components of the computer system 400. The computer 406 also includes a graphical processing unit (GPU) 420. The latter may also be used for computational purposes as an adjunct to, or instead of, the (CPU) 410, for mathematical calculations.

The external devices 408 can include a microphone 426, a speaker 428 and a camera 430. Although shown as external devices, they may alternatively be built in as part of the hardware of the computer system 400. The various components of the computer system 400 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems such as servers in communication with one another on a computer network. One example is where the network components 18, 20, 22, 24, 30 are in communication with one another on a communications network, such that each of the network components 18, 20, 22, 24, 30 are implemented on a computer system 400.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method for deploying a containerized application from a central application management hub to a plurality of cloud environments, the method comprising the steps of:
providing an interface for visualizing development results of the containerized application by a developer, the development results including further modifications to the contents of a containerized application;
receiving the containerized application suitable for deployment;
receiving an environment file designating a first environment and a second environment of the plurality of cloud environments;
consulting a routing table to determine a first network path associated with the first environment and a second network path associated with the second environment;
generating packets of the containerized application; and
sending the packets on the first network path and the second network path;
controlling via a central control plane how the containerized application is to be deployed in various cloud locations in the plurality of cloud environments, the control plane implementing respective operator services of each of the plurality of cloud environments that facilitate and govern the containerized application deployment, such that the control plane centrally manages visualization of base images of the containerized application in the control plane for interaction in implementing the further modifications by the developer when using the interface;
wherein the containerized application is received by the respective operator services of the first environment and the second environment for subsequent deployment.

2. The method of claim 1 further comprising each of the cloud environments utilizing a respective container orchestration platform.

3. The method of claim 2 further comprising each of the cloud environments utilizing a respective operator service for interacting with the respective container orchestration platform acting as controllers for a custom resource of the containerized application.

4. The method of claim 3 further comprising controlling via the control plane how the containerized application is deployed to hosted in various cloud locations, the control plane implementing the respective operator services that facilitate and govern the containerized application deployment.

5. The method of claim 4 further comprising a controller of the respective operator service running outside of the control plane.

6. The method of claim 5, wherein the controller is run in the cloud environment as a deployment.

7. The method of claim 4, wherein the control plane is common to and thus shared a plurality of the containerized applications and the plurality of cloud environments.

8. The method of claim 1 further comprising each of the cloud environments utilizing a respective cloud services platform providing for deployment of the containerized application using a respective a cloud infrastructure by detaching computing capabilities from hardware components.

9. The method of claim 1 further comprising each of the cloud environments utilizing a respective cloud computing security service.

10. The method of claim 1 further comprising utilizing the routing table for the data packets of the containerized application.

11. The method of claim 10, wherein the routing table is part of the control plane.

12. The method of claim 10, wherein the first and second network paths are stored in the routing table.

13. A system for deploying a containerized application from a central application management hub to a plurality of cloud environments, the system comprising:
a processor and memory for implementing the steps of:
providing an interface for visualizing development results of the containerized application by a developer, the development results including further modifications to the contents of a containerized application;
receiving the containerized application suitable for deployment;
receiving an environment file designating a first environment and a second environment of the plurality of cloud environments;
consulting a routing table to determine a first network path associated with the first environment and a second network path associated with the second environment;
generating packets of the containerized application; and
sending the packets on the first network path and the second network path;
controlling via a central control plane how the containerized application is to be deployed in various cloud locations in the plurality of cloud environments, the control plane implementing respective operator services of each of the plurality of cloud environments that facilitate and govern the containerized application deployment, such that the control plane centrally manages visualization of base images of the containerized application in the control plane for interaction in implementing the further modifications by the developer when using the interface;
wherein the containerized application is received by the respective operator services of the first environment and the second environment for subsequent deployment.

14. The system of claim 13 further comprising each of the cloud environments having a respective container orchestration platform.

15. The system of claim 14 further comprising each of the cloud environments having a respective operator service for interacting with the respective container orchestration platform acting as controllers for a custom resource of the containerized application.

16. The system of claim 15 further comprising the control plane for controlling how the containerized application is deployed to hosted in various cloud locations, the control plane implementing the respective operator services that facilitate and govern the containerized application deployment.

17. The system of claim 16 further comprising a controller of the respective operator service running outside of the control plane.

18. The system of claim 13 further comprising each of the cloud environments having a respective cloud services platform providing for deployment of the containerized application using a respective a cloud infrastructure by detaching computing capabilities from hardware components.

19. The system of claim 13 further comprising each of the cloud environments having a respective cloud computing security service.

20. The system of claim 13 further comprising utilizing the routing table for the data packets of the containerized application.

\* \* \* \* \*